United States Patent [19]

Persson

[11] 3,971,401
[45] July 27, 1976

[54] SILLCOCK

[75] Inventor: Bengt Arne Persson, Djursholm, Sweden

[73] Assignee: B A Installationsutveckling AB, Djursholm, Sweden

[22] Filed: Aug. 29, 1974

[21] Appl. No.: 501,823

[30] Foreign Application Priority Data

Aug. 31, 1973 Sweden .............................. 7311923
Aug. 16, 1974 Sweden .............................. 7410483

[52] U.S. Cl. .................................... 137/360; 85/4; 285/32; 285/161
[51] Int. Cl.² .......................................... F16K 51/00
[58] Field of Search ............ 137/301, 302, 217, 218, 137/359, 360; 85/4; 285/20, 32, 161

[56] References Cited
UNITED STATES PATENTS

| | | | |
|---|---|---|---|
| 535,139 | 3/1895 | Kelly | 285/20 |
| 657,562 | 9/1900 | Neumeyer | 137/360 |
| 968,711 | 8/1910 | Stevenson | 137/360 UX |
| 1,036,684 | 8/1912 | Mueller et al. | 285/32 X |
| 1,419,471 | 6/1922 | Reynolds | 285/161 X |
| 1,467,824 | 9/1923 | Ahlers | 85/4 UX |
| 2,702,715 | 2/1955 | Andrews | 285/32 |
| 3,074,424 | 1/1963 | Pletcher et al. | 137/360 X |
| 3,424,189 | 1/1969 | Woodford | 137/218 |
| 3,494,373 | 2/1970 | Horak et al. | 137/360 X |

*Primary Examiner*—Henry T. Klinksiek
*Attorney, Agent, or Firm*—Haseltine, Lake & Waters

[57] ABSTRACT

A sillcock intended to be mounted in a wall between a warm space and a cold space to provide a water flow passage through the wall comprises a water flow pipe extending between the warm side and the cold side of the wall, a shut-off valve including a valve seat and an associated valve body, a valve control member disposed on the cold side of the wall and a valve control rod disposed within the water flow pipe and connecting the valve control member with the valve. The valve seat of the shut-off valve is located within the water flow pipe at a point along the pipe, which has a lowest temperature exceeding 0°C, when the sillcock is mounted in a wall, and preferably at a point located between the warm side of the wall and the location of the zero isotherm within the wall.

7 Claims, 2 Drawing Figures

SILLCOCK

BACKGROUND OF THE INVENTION

The present invention is related to a water faucet, a so called sillcock, intended to be mounted in a wall between a warm space and a cold space, as for instance in the external wall of a building, so as to provide a water flow passage through the wall from its warm side to its cold side. Such a sillcock generally comprises a pipe providing a water flow passage from the warm side to the cold side of the wall, a shut-off valve means for said water flow passage including a valve seat and an associated valve body, a valve control member, as for instance a rotatable handle, for said valve means, and a control shaft disposed within said pipe and connecting said control member to said shut-off valve means.

Prior art sillcocks of this type are normally designed in such a manner that the valve control member is located together with the water outlet, as for instance a spout or a hose coupling, in the cold space on the cold side of the wall, whereas the shut-off valve is located on the opposite side of the wall in the warm space. The reason for this location of the shut-off valve is that the entire sillcock assembly shall be drained when the shut-off valve is closed so that any freezing of water within the sillcock assembly with accompanying damages on the assembly is prevented.

This prior art design of sillcocks entails, however, that several components of the sillcock cannot be assembled until on the building site and that before this assembly the water flow pipe of the sillcock as well as the control shaft for the shut-off valve must first be cut to lengths adapted to the thickness of the wall in which the sillcock is to be mounted. Further, threaded joints are necessary either within the wall or close to the surfaces of the wall, which joints can give cause to hidden water leakage in the interior of the wall. The shut-off valve occupies also a considerable space on the inner side of the wall. An additional complication is caused by the fact that generally a vacuum valve must be connected to the sillcock when this is mounted.

The object of the present invention is therefore to provide a water faucet or sillcock of the kind defined in the first paragraph of this specification, in which the disadvantages discussed above are eliminated.

SUMMARY OF THE INVENTION

According to the invention this is achieved in that the valve seat is located within the water flow pipe at a point along this, which has a minimum temperature exceeding 0°C when the faucet is mounted in a wall, preferably at a point located between the warm side of the wall and a point within the wall which is estimated to have a minimum temperature of 0°C. In this way it is achieved that no hidden water leaks can arise which could cause water damages within the wall, and that at the mounting of the sillcock in the wall only the water flow pipe but not the valve control shaft has to be cut off to a length adapted to the thickness of the wall. In a preferred embodiment of the invention the valve seat consists of an annular shoulder on the inner side of the wall of the water flow pipe. A sillcock of particularly simple design and easy to mount in a wall is achieved if according to a preferred embodiment of the invention the water flow pipe is integral with a housing which is located on the cold side of the wall and in which a valve control member is mounted and which is provided with coupling means for a vacuum valve. In this case it is achieved that the sillcock is automatically drained through the vacuum valve when the shut-off valve is closed, even if a hose is attached to the water outlet of the sillcock.

In a particularly preferred embodiment of the sillcock according to the invention the water flow pipe is provided with an external thread at the location of the valve seat and a tubular sleeve having a larger inner diameter than the outer diameter of the water flow pipe surrounds the water flow pipe between the valve seat and the warm side of the wall, this tubular sleeve being provided at its end adjacent the valve seat with an internal thread screwed onto the external thread of the water flow pipe and at its opposite end with a radially external flange. By means of this tubular sleeve the sillcock can be fixed in the wall and it is achieved that the warm air from the warm space on the warm side of the wall has access to the space between the water flow pipe and the tubular sleeve and thus is permanently in direct contact with the outer side of the water-filled portion of the water flow pipe as well as with the valve seat. In this way there is provided an additionally increased safety against freezing of the sillcock also at extremely low temperatures on the cold side of the wall.

BRIEF DESCRIPTION OF THE DRAWING

In the following the invention will be further described with reference to the accompanying drawing, in which.

DESCRIPTION OF THE PREFERRED EMBODIMENTS

Figure 1:
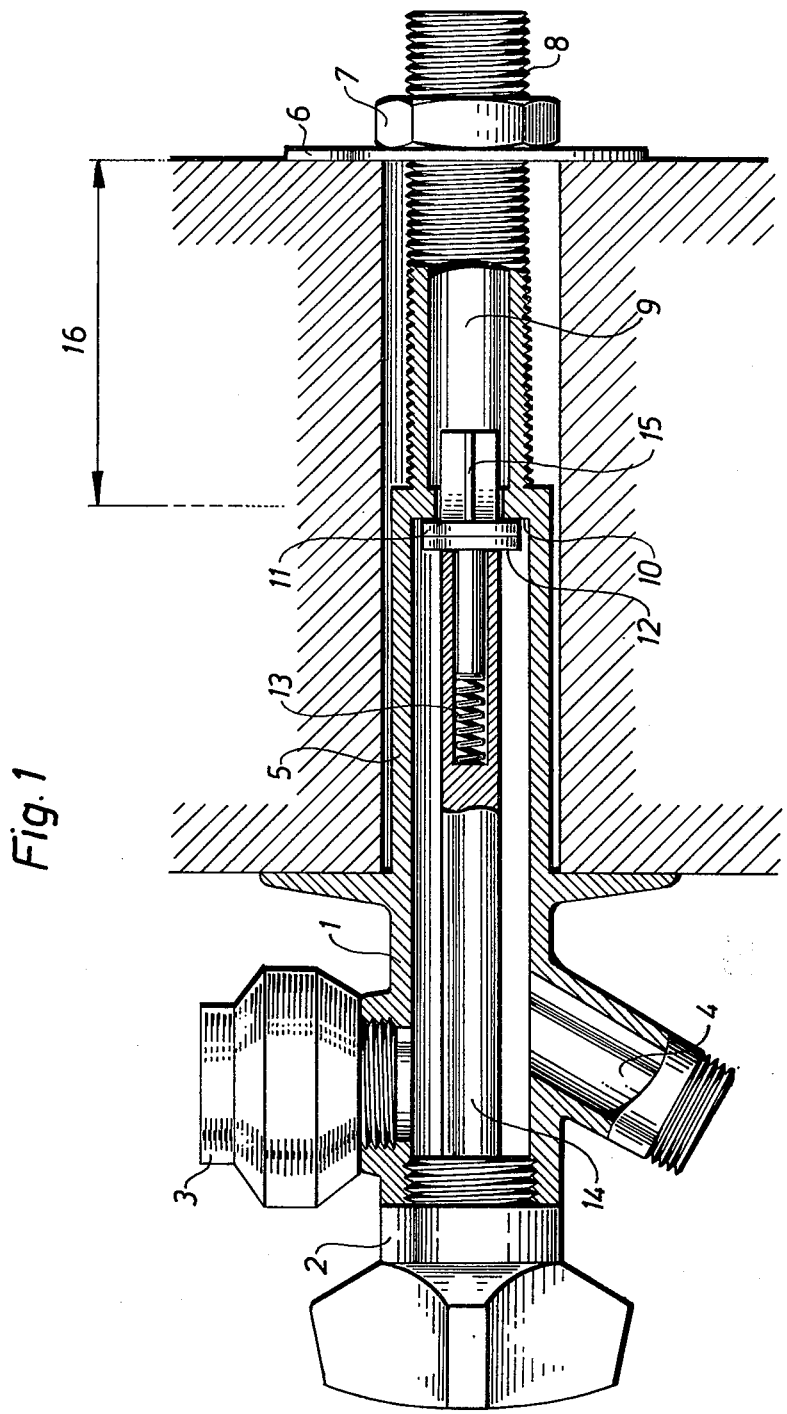
FIG. 1 shows schematically and by way of example a longitudinal cross-section of a first embodiment of a sillcock according to the invention.

The sillcock shown by way of example in FIG. 1 comprises a housing 1 provided with a valve control handle 2, a vacuum valve 3 and a spout 4. The housing 1 is integral with a water flow pipe 5 which extends through an opening in a wall and which is fixed to the wall by means of a washer 6 and a nut 7 on the warm side of the wall. This end of the water flow pipe 5 is provided with an external thread 8 and has an inlet opening 9. A valve seat 10 is provided within the water flow pipe 5 on the inner side of its wall. This valve seat 10 cooperates with a valve washer 11 mounted on a valve body 12, which is mounted in the end of a valve control shaft or valve stem 14 and urged by a spring 13 towards the valve seat 10. The valve body 12 is also provided with a guide pin 15 guided in the valve port surrounded by the valve seat 10 and provided with one or several grooves forming a passage for the water flow through the valve.

The housing 1, the valve control handle 2, the vacuum valve 3 and the spout 4 are located on the cold side of the wall. The water flow pipe 5 extends through the wall to the warm space on the opposite side of the wall, where the sillcock is fixed to the wall by means of the washer 6 and the nut 7 screwed onto the threads 8 of the pipe 5. The valve seat 10 has such a position within the water flow pipe 5 that, when the sillcock is mounted in a wall, the valve seat 10 is located on the warmer side of the zero isotherm within the wall. When the sillcock is in use in that the valve body 12 with the valve washer 11 is removed from the valve seat 10 by rotation of the valve control handle 2, water flows from the inlet end 9 of the water flow pipe 5, which is connected to the system of water mains in the building, through the open shut-off valve 10/11 and the housing 1 to the spout 4.

When the sillcock is shut-off by rotation of the valve control handle 2, the valve washer 11 on the valve body 12 is pressed by the valve control rod 14 against the valve seat 10 so that the water flow is interrupted and the water in the housing 1 is drained through the spout 4. Consequently, the portion of the sillcock situated on the cold side of the zero isotherm in the wall is drained, wherefore no freezing of the sillcock can take place.

By attaching a vacuum valve 3 to the housing 1 it is achieved that, when the shut-off valve of the sillcock is closed, air will flow into the housing 1 through the vacuum valve 3 so that the housing 1 is rapidly drained even if a hose is connected to the spout 4. If the water pressure should disappear when the sillcock is open, the valve body 12 with the valve washer 11 will be pressed by the spring 13 against the valve seat 10, whereby a back-flow of possibly dirty water is prevented. Such a back-flow is also prevented by the vacuum valve 3, which consequently provides a double safety against such back-flow.

By means of the nut 7 on the thread 8 on the pipe 5 the sillcock can be adapted to walls of varying thicknesses within the range indicated by the arrow 16.

Figure 2:
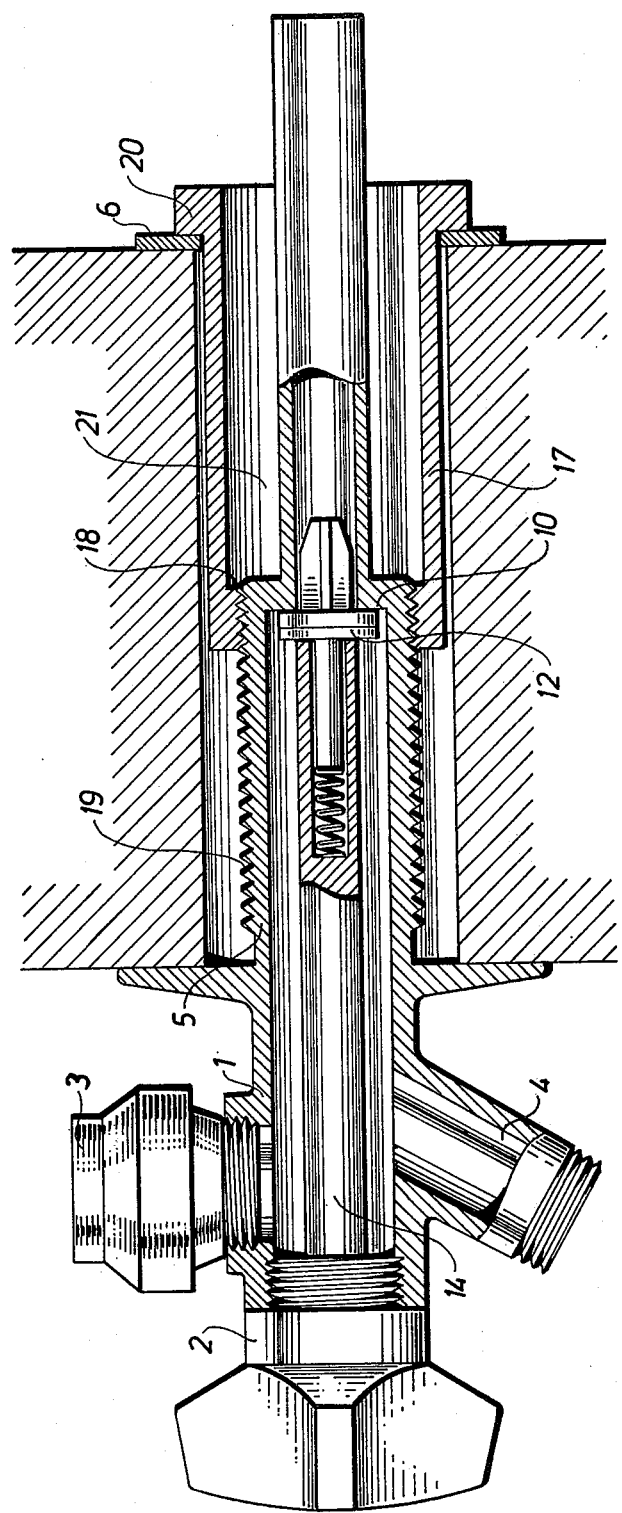
FIG. 2 shows in a similar manner a second embodiment of a sillcock according to the invention.

The sillcock according to the invention illustrated in FIG. 2 comprises just as the sillcock shown in FIG. 1 a housing 1 provided with a valve control handle 2, a vacuum valve 3 and a spout 4. The housing 1 is integral with the water flow pipe 5 which is intended to extend through an opening in the wall between the cold side of the wall (to the left in the drawing) and the warm side of the wall (to the right in the drawing). The water flow pipe 5 is provided with the internal valve seat 10 which cooperates with the valve body 12 which is mounted on the end of the valve control rod 14, which is connected to the valve control handle 2, as described in the foregoing.

This sillcock operates in exactly the same manner as the sillcock 1 illustrated in FIG. 1. The difference relative to the sillcock in FIG. 1 resides in the design of the mounting means for the sillcock in the wall. In the sillcock in FIG. 2 these mounting means consist of a tubular sleeve 17 which has a larger inner diameter than the outer diameter of the water flow pipe 5 and which surrounds the portion of the water flow pipe 5 between the valve seat 10 and the warm side of the wall. The inner end of the sleeve 17 is provided with an internal thread 18 which is screwed onto a corresponding external thread 19 on the portion of the water flow pipe 5 located between the valve seat 10 and the cold side of the wall. The opposite end of the sleeve is provided with a radially external flange 20 or a similar device, which abuts against the surface of the wall around the opening in the wall for the sillcock, possibly via a washer 6. It is appreciated that the sillcock can be fixed in the opening in the wall by tightening of the tubular sleeve 17. The required adjustment of the sillcock to walls of various thicknesses is consequently obtained by screwing the sleeve 17 a corresponding distance onto the external thread 19 on the water flow type 5.

It is realized that this modified design of the sillcock provides that the warm air on the warm side of the wall has access to the open space 21 between the tubular sleeve 17 and the surrounded portion of the water flow pipe 5, whereby this warm air is permanently in direct contact with the outside of the permanently water-filled portion of the water flow pipe 5 as well as with the valve seat 10. This provides an additionally increased safety against freezing of the permanently water-filled portion of the water flow pipe 5 as well as against the valve body 12 freezing fast to the valve seat 10, even if the temperature on the cold side of the wall should be extremely low.

By combining two sillcocks according to the invention and possibly a common vacuum valve one can provide a mixing sillcock for both warm and cold water.

What is claimed is:

1. A water faucet for mounting in a wall between a warm space on one side of the wall and a cold space on the other side of the wall, comprising a pipe extending continuously through the wall and having a first axial end at the warm side of the wall and a second axial end at the cold side of the wall so as to provide a water flow passage through the wall, a shut-off valve for the water flow through said pipe, said shut-off valve including a stationary valve seat fixed within said pipe to the inside of the wall of the pipe at a point along the pipe substantially equally spaced from said first and second ends of the pipe and a movable valve body cooperating with said valve seat, a valve control member at said second end of said pipe, and a valve control rod extending axially within said pipe between said valve control member and said valve body and operatively connecting said valve control member to said valve body.

2. A water faucet for mounting in a wall between a warm space on one side of the wall and a cold space on the other side of the wall, comprising a pipe extending continuously through the wall and having a first axial end at the warm side of the wall and a second axial end at the cold side of the wall so as to provide a water flow passage through the wall, a shut-off valve for the water flow through said pipe, said shut-off valve including a stationary valve seat fixed within said pipe to the inside of the wall of the pipe at a point along the pipe substantially spaced from said first end as well as said second end of the pipe and a movable valve body cooperating with said valve seat, a valve control member at said second end of said pipe, a valve control rod extending axially within said pipe between said valve control member and said valve body and operatively connecting said valve control member to said valve body, said pipe having an external thread at the location of said valve seat, and a tubular sleeve having a substantially larger inner diameter than the outer diameter of said pipe surrounding the portion of said pipe between said valve seat and said first end of said pipe so as to provide an annular coaxial space between said tubular sleeve and said portion of said pipe, said tubular sleeve having at its end adjacent said valve seat an internal thread screwed onto said external thread of said pipe and at its opposite end a radially external flange, said annular space being in open communication with the ambient atmosphere on the warm side of the wall at said first end of said pipe.

3. A water faucet as claimed in claim 2, wherein said external thread on said pipe extends from the location of said valve seat substantially to said second end of said pipe.

4. A water faucet as claimed in claim 2, wherein said pipe has a smaller diameter over the portion of the pipe between said valve seat and said first end of the pipe than over the portion of the pipe between said valve seat and said second end of the pipe.

5. A water faucet as claimed in claim 2, wherein said valve seat comprises an annular coaxial shoulder on the inside of the wall of said pipe.

6. A water faucet as claimed in claim 2, including a housing located on the cold side of the wall and formed in one piece with said second end of said pipe, said valve control member being mounted in said housing, and said housing having connecting means for a vacuum valve.

7. A water faucet for mounting in a wall between a warm space on one side of the wall and a cold space on the other side of the wall, comprising a pipe extending continuously through the wall and having a first axial end at the warm side of the wall and a second axial end at the cold side of the wall so as to provide a water flow passage through the wall, a shut-off valve for the water flow through said pipe, said shut-off valve including an annular coaxial valve seat formed on the inside of the wall of said pipe at a point along the pipe substantially spaced from said first end as well as said second end of the pipe and an axially movable valve body cooperating with said valve seat, a housing located on the cold side of the wall and formed in one piece with said second end of said pipe, said housing having a spout portion and connecting means for a vacuum valve, a valve control member mounted in said housing, a valve control rod extending axially within said pipe between said valve control member and said valve body and operatively connecting said valve control member to said valve body, said pipe having an external thread at the location of said valve seat, and a tubular sleeve having a substantially larger inner diameter than the outer diameter of said tube surrounding the portion of said pipe between said valve seat and said first end of said pipe so as to provide an annular coaxial space between said tubular sleeve and said portion of said pipe, said tubular sleeve having at its end adjacent said valve seat an internal thread screwed onto said external thread of said pipe and at its opposite end a radially external flange, said annular space being in open communication with the ambient atmosphere on the warm side of the wall at said first end of said pipe, said external thread on said pipe extending from the location of said valve seat substantially to said second end of said pipe, and said pipe having a smaller diameter over the portion of the pipe between said valve seat and said first end of the pipe than over the portion of the pipe between said valve seat and said second end of the pipe.

* * * * *